United States Patent

Sentementes et al.

[11] 3,959,525
[45] May 25, 1976

[54] METHOD OF COATING PHOTOFLASH LAMP

[75] Inventors: Thomas J. Sentementes, Wakefield; Eugene A. Castello, North Reading; Richard Coppola, Beverly, all of Mass.

[73] Assignee: GTE Sylvania Incorporated, Danvers, Mass.

[22] Filed: June 24, 1974

[21] Appl. No.: 482,038

[52] U.S. Cl. .......................... 427/185; 118/DIG. 5; 118/505; 427/195; 431/94
[51] Int. Cl.² ...................... B05D 1/24; B05D 3/02
[58] Field of Search ................ 117/DIG. 6, 18, 21, 117/94; 431/94; 427/185, 195; 118/DIG. 5, 505

[56] References Cited
UNITED STATES PATENTS

| | | | |
|---|---|---|---|
| 2,628,077 | 2/1953 | Handwrek | 117/DIG. 6 |
| 2,844,489 | 7/1958 | Gemmer | 117/21 X |
| 2,974,059 | 3/1961 | Gemmer | 117/21 |
| 3,028,251 | 4/1962 | Nagel | 117/21 |
| 3,063,860 | 11/1962 | Gemmer | 117/21 X |
| 3,507,251 | 4/1970 | Thayer et al. | 117/DIG. 6 |
| 3,738,559 | 6/1973 | Tyndale | 117/21 |
| 3,756,852 | 9/1973 | Scheetz et al. | 117/DIG. 6 |
| 3,770,366 | 11/1973 | Audesse et al. | 431/94 |
| 3,827,850 | 8/1974 | Shaffer et al. | 431/94 |
| 3,832,125 | 8/1974 | McDonough | 431/94 |

Primary Examiner—Ronald H. Smith
Assistant Examiner—Shrive P. Beck
Attorney, Agent, or Firm—Edward J. Coleman

[57] ABSTRACT

A method of coating the glass envelope of a photoflash lamp with a thermoplastic material, the method comprising: preheating the glass envelope at a predetermined temperature for approximately one minute; immersing the heated envelope into a fluidized bed of powdered thermoplastic material from 1 to 5 seconds; removing the coated lamp from the fluidized bed; and postheating the coated envelope at a predetermined temperature for about 1 minute. To assist in preventing inadvertent flashing during these steps, the lamp can be held by a heat sink structure gripping the ignition leads or primer tube.

9 Claims, 7 Drawing Figures

U.S. Patent May 25, 1976 3,959,525
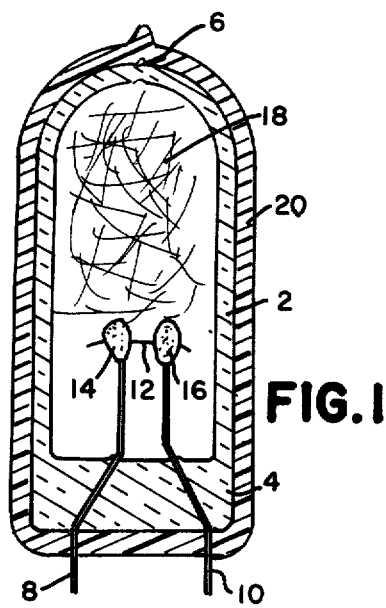
FIG.1
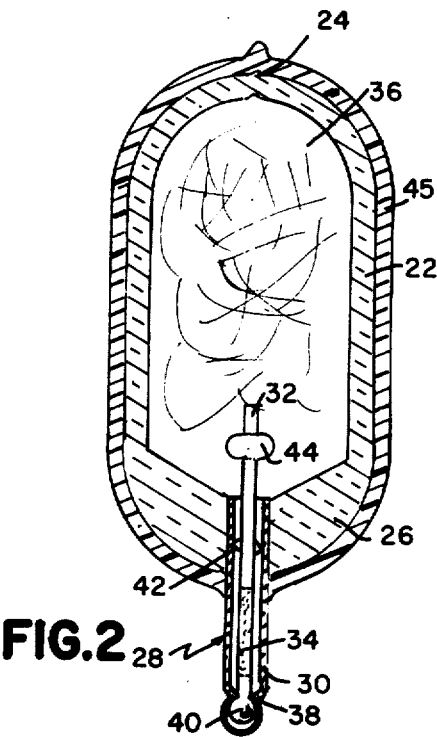
FIG.2
FIG.3 FIG.4
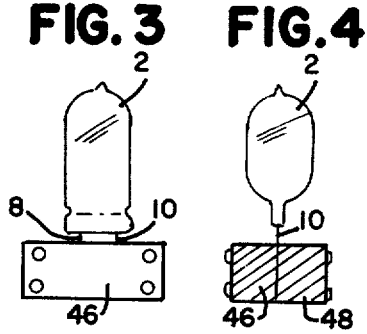
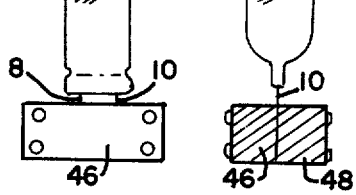
FIG.5 FIG.6
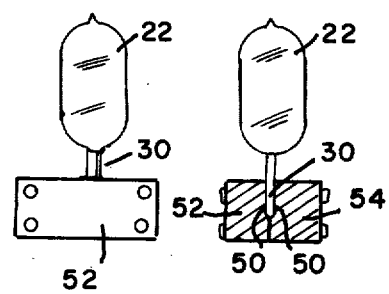
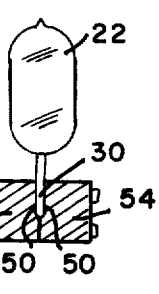
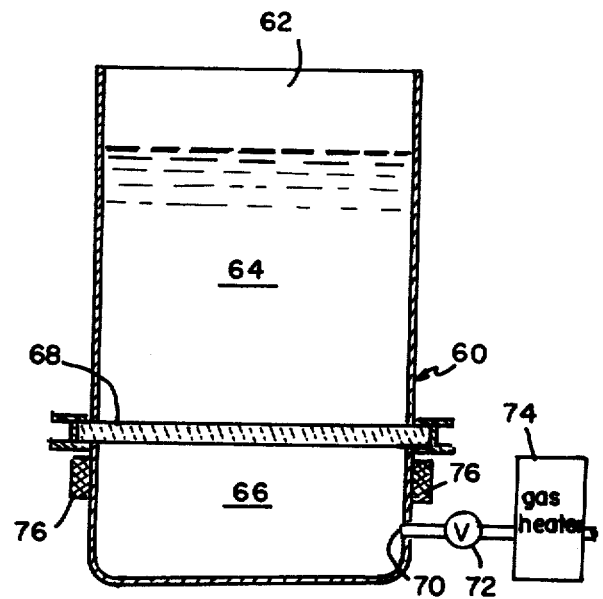
FIG.7

METHOD OF COATING PHOTOFLASH LAMP

BACKGROUND OF THE INVENTION

This invention relates to photoflash lamps and, more particularly, to an improved method for applying a polymeric coating on the glass envelope of a flashlamp.

A typical photoflash lamp comprises an hermetically sealed glass envelope, a quantity of combustible material located in the envelope, such as shredded zirconium or hafnium foil, and a combustion supporting gas, such as oxygen, at a pressure well above one atmosphere. The lamp also includes an electrically or percussively activated primer for igniting the combustible material to flash the lamp. During lamp flashing, the glass envelope is subject to severe thermal shock due to hot globules of metal oxide impinging on the walls of the lamp. As a result, cracks and crazes occur in the glass and, at higher internal pressures, containment becomes impossible. In order to reinforce the glass envelope and improve its containment capability, it has been common practice to apply a protective lacquer coating on the lamp envelope by means of a dip process. To build up the desired coating thickness, the glass envelope is generally dipped a number of times into a lacquer solution containing a solvent and a selected resin, typically cellulose acetate. After each dip, the lamp is dried to evaporate the solvent and leave the desired coating of cellulose acetate, or whatever other plastic resin is employed.

In the typical dipping process for applying protective coatings, a large number of flashlamps are loaded on a rack and then successively dipped in a solvent solution and oven dried three or four times to build up the desired coating thickness. Such a process is time consuming, uses a relatively large area of production floor space, and involves considerable hand labor, all of which add significantly to manufacturing cost. Further, as the lacquer solution includes a highly flammable solvent, such as acetone, an inadvertent flashing of one of the lamps in either the dip bath or drying oven can ignite the solvent fumes. To control this hazard safely, costly automatic extinguishing equipment must be employed. In the event of a solvent ignition, the resulting downtime and consumption of fire extinguishing chemical also adds to the manufacturing cost.

Application of the protective coating by means of a dipping process can also preclude the use of more desirable reinforcing materials. For example, a much stronger containment vessel could be provided by the use of a polycarbonate coating, due to its higher impact strength and higher softening temperature, as compared to cellulose acetate. By using the conventional dipping and drying process to apply polycarbonate, however, a relatively cloudy coating results. In order to obtain a clear, transparent coating, an extremely low humidity must be maintained in the drying ovens, which in turn requires the drying of 5000 to 10,000 cubic feet of air per minute. The incorporation of such a drying operation would be prohibitively expensive.

SUMMARY OF THE INVENTION

In view of the foregoing, it is an object of this invention to provide an improved method for applying a protective coating on the glass envelope of a photoflash lamp.

It is a particular object of the invention to provide a solventless method of coating the glass envelope of a photoflash lamp with a polymeric material which is more readily integratable with continuous, mechanized production processes.

These and other objects, advantages and features are attained in accordance with the invention by a method comprising: heating the glass envelope of the lamp at a predetermined temperature for approximately one minute; immersing the heated glass envelope in a fluidized bed of powdered polymeric material for less than about five seconds; and removing the coated lamp from the fluidized bed. Where necessary to improve coating uniformity, the coated lamp may be reheated at a second predetermined temperature for approximately one minute subsequent to removal from the fluidized bed. To assist in preventing inadvertent flashing during the coating process, the lamp can be held during these steps by heat sink means gripping the exterior metallic portion of the lamp ignition structure.

The method is solventless and provides a continuous, optically clear protective coating on the exterior surface of the glass envelope. Further, it provides a faster, safer and more economical manufacturing process which may be readily integrated on automated production machinery. In addition, the method permits the use of the stronger, more temperature resistant thermoplastics, such as polycarbonate.

Various fluidized bed processes employing preheating and/or postheating have been described for coating articles. For example, see U.S. Pat. Nos. 2,844,489; 2,974,060; 2,987,413; 3,090,696; and 3,587,523. However, none of these listed references specifically describe the application of such processes for coating the relatively thin glass envelope of a pressurized flashlamp having an ignition structure containing primer material. This is not surprising, as the obvious drawback presented is the high liklihood of inadvertently igniting the lamp as a result of thermal activation of the primer by the heat applied to the article during the process. Another anticipated problem, would be the difficulty of obtaining a continuous, optically clear coating. More recently, however, U.S. Pat. No. 3,738,559 of William B. Tyndale describes a significantly different fluidized bed approach for providing cellulose acetate coatings on the exterior surface of photoflash lamps. Contrary to our method and the methods employed by the patents listed above, the Tyndale patent describes a process wherein, in lieu of a preheating step, each lamp is coated with a solvent primer prior to immersion in the fluidized bed. After removal from the bed, the lamp is passed through a heated-solvent vapor tank to dissolve the powder on the flashlamp into a liquid coating, which is thereafter dried by passing the lamp through a vacuum dryer. Hence, the Tyndale method is somewhat more complicated than the present invention and, although providing an alternative to the lacquer dip process for flashlamps, does not avoid the use of solvents.

BRIEF DESCRIPTION OF THE DRAWINGS

This invention will be more fully described hereinafter in conjunction with the accompanying drawings, in which:

FIG. 1 is an enlarged sectional elevation of an electrically ignitable photoflash lamp having a protective coating applied in accordance with the invention;

FIG. 2 is an enlarged sectional elevational of a percussive-type photoflash lamp having a protective coating applied in accordance with the invention;

FIG. 3 is a front view of the lamp of FIG. 1 engaged in a heat sink holder;

FIG. 4 is a side view of FIG. 3, partly in section;

FIG. 5 is a front view of the lamp of FIG. 2 engaged in a heat sink holder;

FIG. 6 is a side view of FIG. 5, partly in section; and

FIG. 7 is a sectional schematic view of a fluidized bed apparatus useful for carrying out the present invention.

DESCRIPTION OF PREFERRED EMBODIMENT

The teachings of the present invention are applicable to either percussive or electrically ignited photoflash lamps of a wide variety of sizes and shapes. Accordingly, FIGS. 1 and 2 respectively illustrate electrically ignited and percussive-type photoflash lamps coated in accordance with the invention.

Referring to FIG. 1, the electrically ignitable lamp comprises an hermetically sealed lamp envelope 2 of glass tubing having a press 4 defining one end thereof and an exhaust tip 6 defining the other end thereof. Supported by the press 4 is an ignition means comprising a pair of lead-in wires 8 and 10 extending through and sealed into the press. A filament 12 spans the inner ends of the lead-in wires, and beads of primer 14 and 16 are located on the inner ends of the lead-in wires 8 and 10 respectively at their junction with the filament. Typically, the lamp envelope 2 has an internal diameter of less than ½ inch, and an internal volume of less than 1 cc., although the present invention is equally suitable for application to larger lamp sizes. A combustion-supporting gas, such as oxygen, and a filamentary combustible material 18, such as shredded zirconium or hafnium foil, are disposed within the lamp envelope. Typically, the combustion-supporting gas fill is at a pressure exceeding one atmosphere, with the more recent subminiature lamp types having oxygen fill pressures of up to several atmospheres. As will be described in more detail hereinafter, the glass envelope 2 is reinforced, in accordance with the invention, by a polymeric coating 20 on its exterior surface.

The percussive-photoflash lamp illustrated in FIG. 2 comprises a length of glass tubing defining an hermetically sealed lamp envelope 22 constricted at one end to define an exhaust tip 24 and shaped to define a seal 26 about a primer 28 at the other end thereof. The primer 28 comprises a metal tube 30, a wire anvil 32, and a charge of fulminating material 34. A combustible 36, such as filamentary zirconium or hafnium, and a combustion supporting gas, such as oxygen, are disposed within the lamp envelope, with the fill gas being at a pressure of greater than one atmosphere. As will be detailed hereinafter, the exterior surface of glass envelope 22 is covered by a polymeric coating 45 in accordance with the invention.

The wire anvil 32 is centered within the tube 30 and is held in place by a circumferential indenture 38 of the tube 30 which loops over the head 40, or other suitable protuberance, at the lower extremity of the wire anvil. Additional means, such as lobes 42 on wire anvil 32 for example, may also be used in stabilizing the wire anvil, supporting it substantially coaxial within the primer tube 30 and insuring clearance between the fulminating material 34 and the inside wall of tube 30. A refractory bead 44 is fused to the wire anvil 32 just above the inner mouth of the primer tube 30 to eliminate burn-through and function as a deflector to deflect and control the ejection of hot particles of fulminating material from the primer. The lamp of FIG. 2 is also typically a subminiature type having envelope dimensions similar to those described with respect to FIG. 1.

Although the lamp of FIG. 1 is electrically ignited, usually from a battery source, and the lamp of FIG. 2 is percussion-ignitable, the lamps are similar in that in each the ignition means is attached to one end of the lamp envelope and disposed in operative relationship with respect to the filamentary combustible material. More specifically the igniter filament 12 of the flash lamp in FIG. 1 is incandesced electrically by current passing through the metal filament support leads 8 and 10, whereupon the incandesced filament 12 ignites the beads of primer 14 and 16 which in turn ignite the combustible 18 disposed within the lamp envelope. Operation of the percussive-type lamp of FIG. 2 is initiated by an impact onto tube 30 to cause deflagration of the fulminating material 34 up through the tube 30 to ignite the combustible 36 disposed within the lamp envelope.

In accordance with the present invention, we have discovered a solventless method for applying an optically clear protective coating on the exterior surface of the glass envelope. The method provides a significantly faster, safer and more economical manufacturing process, and it may be easily integrated on automated production machinery. Further, the method permits use of the stronger, more temperature resistant thermoplastics, such as polycarbonate.

In carrying out the improved coating method of our invention, the polymeric material, initially in the form of pulverulent particles, is transformed into a continuously fluidized bed by introducing an upwardly flowing stream of gas under pressure, the bed being maintained in the fluidized state by controlling the flow of the gas. The glass envelope of the flashlamp is preheated at a predetermined temperature for approximately one minute and is then immersed in the fluidized bed of powdered polymeric material for a period of less than five seconds. Individual particles of the polymeric material adhere and melt or fuse together with other particles on the hot exterior surface of the immersed glass envelope to form a continuous coating thereon. After removal from the fluidized bed, the coated glass envelope can be reheated at a predetermined temperature for approximately one minute to improve the coating uniformity if necessary. Upon cooling the coating exerts a compressive stress on the envelope wall which makes it stronger with respect to containment.

We have obtained satisfactory flashlamp coatings by employing envelope preheat temperatures within a range from about 270° to 340°C for periods of from 60–62 seconds. These temperatures have been found sufficient to melt the polymeric material and obtain a proper deposition of the powder on the envelope wall. The coating thickness is determined by the preheat temperature and the duration of immersion in the fluidized bed. In addition, the preheat and postheat temperatures and durations are selected to preclude inadvertent ignition of the lamps. To further assist in avoiding an unwanted thermal activation of the primer 14, 16 or fulminating material 34, the lamp may be held during the heating and immersing steps by a heat sink structure gripping the exterior metallic portion of the ignition means. For example, FIGS. 3 and 4 show the electrical lamp of FIG. 1 with its leads 8 and 10 gripped by a pair of metal blocks 46 and 48 which securely hold the lamp and function as a heat sink to draw heat from the primer and filament region while the lamp is heated and immersed during the coating process. FIGS. 5 and 6 show the percussive lamp of FIG. 2 with its primer tube 30 engaged within a suitable cavity 50 formed by the pair of metal blocks 52 and 54. These blocks function was a heat sink holder to draw heat from the fulminating material 34 via anvil 32 and primer tube 30 during the coating process.

The powder bed may be fluidized by a gas at room temperature, in which case the coating procedure is referred to as a "cold bed" process. Preferably, however, the fluidized bed is heated above room temperature to maintain the polymers in a dry condition and also supply some of the heat necessary for fusion of the particles. This coating procedure is referred to as a "hot bed" process. The temperature of the bed should be below the fusion point of the polymers but high enough to maintain a dry condition.

A fluidized bed apparatus useful for carrying out the invention is illustrated in FIG. 7. The apparatus includes a container 60 which may be constructed of a convenient structural material, such as steel, and which has an open top as indicated at 62. The container 60 is divided into an upper chamber 64, in which the powdered polymeric material is confined, and a pressure chamber 66 by a gas pervious partition 68. The partition, which should be pervious to the gas used but impervious to the particles of polymeric material, may take the form of a porous ceramic plate or a sintered metal porous plate, although other similar structures may be used.

The container 60 is provided with a gas inlet opening 70 which is adpated for connection through a shut off valve 72 to a suitable source of gas under pressure in order to pressurize the chamber 66. The source of gas under pressure is not shown since it may consist of any conventional source such as a steel "bottle" or precompressed gas. For the case of the "hot bed" process, the gas line further includes a gas heater 74, and an electrically energized band heater 76 disposed about chamber 66 to maintain the temperature of the gas.

In the practice of this invention, a quantity of very finely divided polymeric material is placed in the upper chamber 64 of the container 60 and gas under pressure is admitted through the connection 70 into the pressure chamber 66. The gas from the lower chamber 66 passes through the gas-pervious partition 68 and flows upwardly in many finely divided streams through the powdered polymeric material. The upwardly moving gas causes the formation of a fluidized bed, which is a combination of solid particles of coating material and the fluidizing gas which exhibits the liquidlike characteristics of mobility, hydrostatic pressure, and an observable upper free surface or boundary zone across which a marked change in concentration of particles occur. In a fluidized bed, the random motion of the particles increases with increasing velocity of the supporting medium, viz., the gas flow.

In our lamp coating process we prefer the use of an inert gas, such as nitrogen, which is non-oxidizing to the polymer. Further, although many fluidized bed processes employ air as the fluidizing medium, we prefer the use of an inert gas as it would not create a fire hazard in the event a flashlamp exploded during the process.

As the powdered coating material, we prefer to use polycarbonate resin that has been cryogenically ground to a fine particle size between 100 and 325 mesh. Other thermoplastic materials that have been successfully applied to flashlamps using the methods of the present invention inlcude cellulose acetate propionate, epoxy, nylon, polyvinyl chloride, ionomer, methylpentene, ionomer-epoxy combinations, and ionomer-acrylic. As the fluidizing gas we have used nitrogen at a pressure of about 20 pounds per square inch (guage) flowing at about 35 standard cubic feet per hour.

In a typical application of the "cold bed" process, a percussive flashlamp of the type shown in FIG. 2 was provided with a clear coating 45 of polycarbonate resin having a wall thickness of about 10 mils. The lamp contained a combustible fill 36 comprising 18.5 mgs. of shredded zirconium foil and oxygen at a fill pressure of 500 cm. Hg. The tubular envelope 22 was formed of G-1 type soft glass and had an outside diameter of 0.350 inch, an inside diameter of 0.293 inch, and an internal volume of 0.68 cc. In the coating process, the lamp was mounted on a conveyor belt and passed through a preheating oven set at a temperature of about 270°C. The length of the oven and speed of the conveyor belt was such that the lamp envelope was preheated for about 62 seconds. The lamp envelope was then immersed in the fluidized bed for about 3 seconds, the bed being fluidized by nitrogen supplied at room temperature. After removal from the fluidized bed, the lamp was conveyed through another oven set at a temperature of about 215°C, whereby the coated envelope was postheated for about 62 seconds. During this process, the heat sink blocks of FIGS. 5 and 6 were not employed. The post heat oven temperature could range up to about 255°C and the postheat time period could range from about 32 to 67 seconds. Beyond the postheat time and temperature maximums, inadvertent lamp ignition was experienced, and below the postheat time and temperature minimums, poor coatings resulted.

In a typical application of the "hot bed" process for coating the same type percussive lamp with a layer of polycarbonate about 10 mils thick, the lamp primer tube 30 was secured in a set of heat sink blocks, 52 and 54 as shown in FIGS. 5 and 6. The lamp was first placed in a preheat oven set at about 340°C for about 1 minute. The heated lamp envelope was then immersed for about one second in a fluidized bed, such as that shown in FIG. 7, which was heated to a temperature of about 100°F. After removal from the heated fluidized bed, the lamp was again placed in the 340°C oven for about one minute as a postheating step to provide a clear, continuous coating.

Although the invention has been described with respect to specific embodiments, it will be appreciated that modifications and changes may be made by those skilled in the art without departing from the true spirit and scope of the invention.

What we claim is:

1. A method of coating the glass envelope of a photoflash lamp with a polymeric material wherein said lamp includes a quantity of combustible material located inside the envelope, ignition means attached to said envelope and having an exterior metallic portion extending from the glass envelope, said method comprising:

heating the glass envelope of said lamp at a first predetermined temperature above the melting point of the polymeric material for approximately 1 minute, immersing said heated glass envelope in a fluidized bed of a powder of said polymeric material for less than about five seconds, said lamp being held during said heating and immersing steps by heat sink means gripping said exterior metallic portion of the ignition means, and removing the coated lamp from said fluidized bed.

2. The method of claim 1 wherein said polymeric material is a thermoplastic and said first predetermined temperature is within a range from about 270°C to 340°C.

3. The method of claim 1 including the further step of reheating said coated glass envelope at a second predetermined temperature above the melting point of the polymeric material for approximately one minute subsequent to removing the lamp from the fluidized bed, said lamp being held during said reheating step by said heat sink means gripping said exterior metallic portion of the ignition means.

4. The method of claim 3 wherein said polymeric material is polycarbonate, said heating step prior to immersion comprises heating said glass envelope at about 270°C for about 62 seconds, said bed of powdered polycarbonate is fluidized by an inert gas at room temperature, said heated glass envelope is immersed in said fluidized bed for about 3 seconds, and said reheating step subsequent to removal of the lamp from the fluidized bed comprises heating said coated glass envelope at a temperature within a range from about 215° to 255°C for a period of from about 32 to 67 seconds.

5. The method of claim 1 wherein said fluidized bed in heated above room temperature.

6. The method of claim 5 including the further step of reheating said coated glass envelope at a second predetermined temperature above the melting point of the polymeric material for approximately 1 minute subsequent to removing the lamp from the fluidized bed, said lamp being held during said reheating step by said heat sink means gripping said exterior metallic portion of the ignition means.

7. The method of claim 6 wherein said polymeric material is a thermoplastic, said bed of powdered thermoplastic is fluidized by an inert gas and heated to a temperature of about 100°F, and said heated glass envelope is immersed in said fluidized bed for about one second.

8. The method of claim 7 wherein said thermoplastic material is polycarbonate, and said first and second predetermined temperatures are both about 340°C.

9. The method of claim 6 wherein the powdered polymeric material in said fluidized bed has a cryogenically ground particle size of between about 100 and 325 mesh, said inert gas is nitrogen at a pressure of about 20 pounds per square inch (guage) flowing at about 35 standard cubic per feet hour.

* * * * *